United States Patent
Cooper et al.

(10) Patent No.: US 7,296,965 B2
(45) Date of Patent: Nov. 20, 2007

(54) CRYOGENIC BEARINGS

(75) Inventors: Clark V. Cooper, Glastonbury, CT (US); William K. Tredway, Manchester, CT (US); Roy N. Guile, Wethersfield, CT (US); Chris C. Rhemer, Palm Beach Gardens, FL (US); Alan B. Minick, Stuart, FL (US); Leonard W. Chapman, Boca Raton, FL (US)

(73) Assignee: United Technologies Corporation, Hartford, CT (US)

( * ) Notice: Subject to any disclaimer, the term of this patent is extended or adjusted under 35 U.S.C. 154(b) by 345 days.

(21) Appl. No.: 10/925,320

(22) Filed: Aug. 23, 2004

(65) Prior Publication Data

US 2006/0040097 A1 Feb. 23, 2006

(51) Int. Cl.
*F04D 29/56* (2006.01)
*C23C 14/00* (2006.01)

(52) U.S. Cl. .............. 415/111; 384/907.1; 415/229

(58) Field of Classification Search ........... 415/229, 415/178, 110, 111; 384/303, 907.1
See application file for complete search history.

(56) References Cited

U.S. PATENT DOCUMENTS

| 5,352,493 | A | 10/1994 | Dorfman et al. |
| 5,466,431 | A | 11/1995 | Dorfman et al. |
| 5,529,464 | A | 6/1996 | Emerson et al. |
| 5,728,465 | A | 3/1998 | Dorfman et al. |
| 5,827,040 | A * | 10/1998 | Bosley et al. ............... 415/106 |
| 6,158,893 | A | 12/2000 | Heshmat |
| 6,200,675 | B1 | 3/2001 | Neerinck et al. |
| 6,228,471 | B1 | 5/2001 | Neerinck et al. |
| 6,527,447 | B2 * | 3/2003 | Obara ........................ 384/297 |
| 6,740,428 | B2 * | 5/2004 | Norito et al. ............... 428/673 |

OTHER PUBLICATIONS

High Performance Liquid Hydrogen Turbopumps, NASA Preferred Reliability Practices, PD-ED 1268, date unknown.
C.Corte et al., Load Capacity Estimation of Foil Air Journal Bearings for Oil-Free Turbomachinery Applications, NASA/TM-2000-209782 Oct. 2000.
C.DellaCorte et al., Performance and Durability of High Temperature Foil Air Bearings for Oil-Free Turbomachinery, NASA/TM-2000-209187/REV1, Mar. 2000.
C. Corte et al., Oil-Free Turbomachinery Technology for Regional Jet, Rotorcraft and Supersonic Business Jet Propulsion Engines, ISABE-2003-1182, 2003.

* cited by examiner

*Primary Examiner*—Edward K. Look
*Assistant Examiner*—Dwayne J White
(74) *Attorney, Agent, or Firm*—Bachman & LaPointe, P.C.

(57) ABSTRACT

The bearing system includes a first component having a first substrate and a first coating. The first coating includes a DLC layer and a DLN layer between the DLC layer and the substrate. A second component is in sliding engagement with the first component.

20 Claims, 5 Drawing Sheets

CRYOGENIC BEARINGS

BACKGROUND OF THE INVENTION

The invention relates to bearings. More particularly, the invention relates to bearings in cryogenic turbopumps.

Various turbomachines are subject to use at cryogenic temperatures. For example, turbopumps are used in rocket propulsion to pump cryogenic liquids such as oxygen, hydrogen, and hydrazine. One exemplary turbopump configuration is shown in U.S. Pat. No. 5,529,464.

Bearing performance is critical to operation of such machines. Often, the machines are subject to a variety of conditions including start-up, shut-down, and other transient operations. For example, the bearings may be configured for lubrication by the working fluid. However, a lack of such fluid in start-up and shut-down conditions may exacerbate asperity contact between bearing surfaces. Accordingly, much development work has gone into bearings for such applications. Among these are the variety of complex foil bearing constructions (e.g., as proposed in U.S. Pat. No. 6,158,893).

Separately, technologies have developed regarding the deposition of so-called diamond-like coatings including diamond-like carbon (DLC) and diamond-like nanocomposite (DLN) coatings. Exemplary DLN coatings are described in U.S. Pat. Nos. 5,352,493, 5,466,431, 5,728,465, 6,200,675, and 6,228,471. Exemplary DLC and DLN coatings and application services are available from Bekaert Dymonics n.v., Zulte, Belgium. Diamond-like coatings are generally amorphous carbon-based coatings with a high hardness and a low coefficient of friction. Exemplary DLC coatings involve a mixture of SP2 and SP3 bonded carbon atoms stabilized by hydrogen. Exemplary DLN coatings involve interpenetrating networks of a-C:H and a-SI:O. The compositional balances and addition of dopants may vary coating properties.

SUMMARY OF THE INVENTION

One aspect of the invention involves a bearing system. A first component has a first substrate and a first coating. The first coating comprises a DLC layer and a DLN layer between the DLC layer and the substrate. A second component is in bearing engagement with the first component (e.g., dry or fluidicly lubricated sliding engagement).

In various implementations, the first coating may consist essentially of the DLC layer and the DLN layer. The second component may include a second substrate and a second coating engaging the first coating via said sliding engagement. The second coating may act as a solid lubricant effective to provide a coefficient of friction of less than 0.2. The second coating may comprise silver in an amount effective to act as a solid lubricant. The second coating may have a thickness of 12.5-50 μm. The first and second components may be in the sliding engagement along an essentially radial intersection (e.g., acting as a thrust bearing). The system may be a non-foil journal bearing. The first coating may have a characteristic thickness of 0.5-5.0 μm. The first substrate may be titanium-based. The second substrate may be a superalloy, comprising in major mass part one or more of nickel, iron, and cobalt. The first substrate may be a rotor of a turbopump. The second substrate may be a bearing of a housing of the turbopump. The turbopump may be driven by a first flow of a first fluid. The turbopump may pump a second flow of a second fluid at a temperature below −150° C.

Another aspect of the invention involves a method for forming a bearing surface on a titanium-based substrate. A coating is applied having a carbon-based first layer and a carbon-based second layer of different composition than the first layer. The first layer is between the substrate and the second layer. The first layer is harder than the second layer and the second layer has a higher lubricity than the first layer.

In various implementations, the applying may comprise at least one of PVD and PACVD. The first layer may consist essentially of DLN and the second layer may consist essentially of DLC. The applying may provide the coating with a coefficient of thermal expansion between 30% and 120% of a coefficient of thermal expansion of the substrate. The second layer may be placed in sliding engagement with a silver-based coating on a second substrate.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
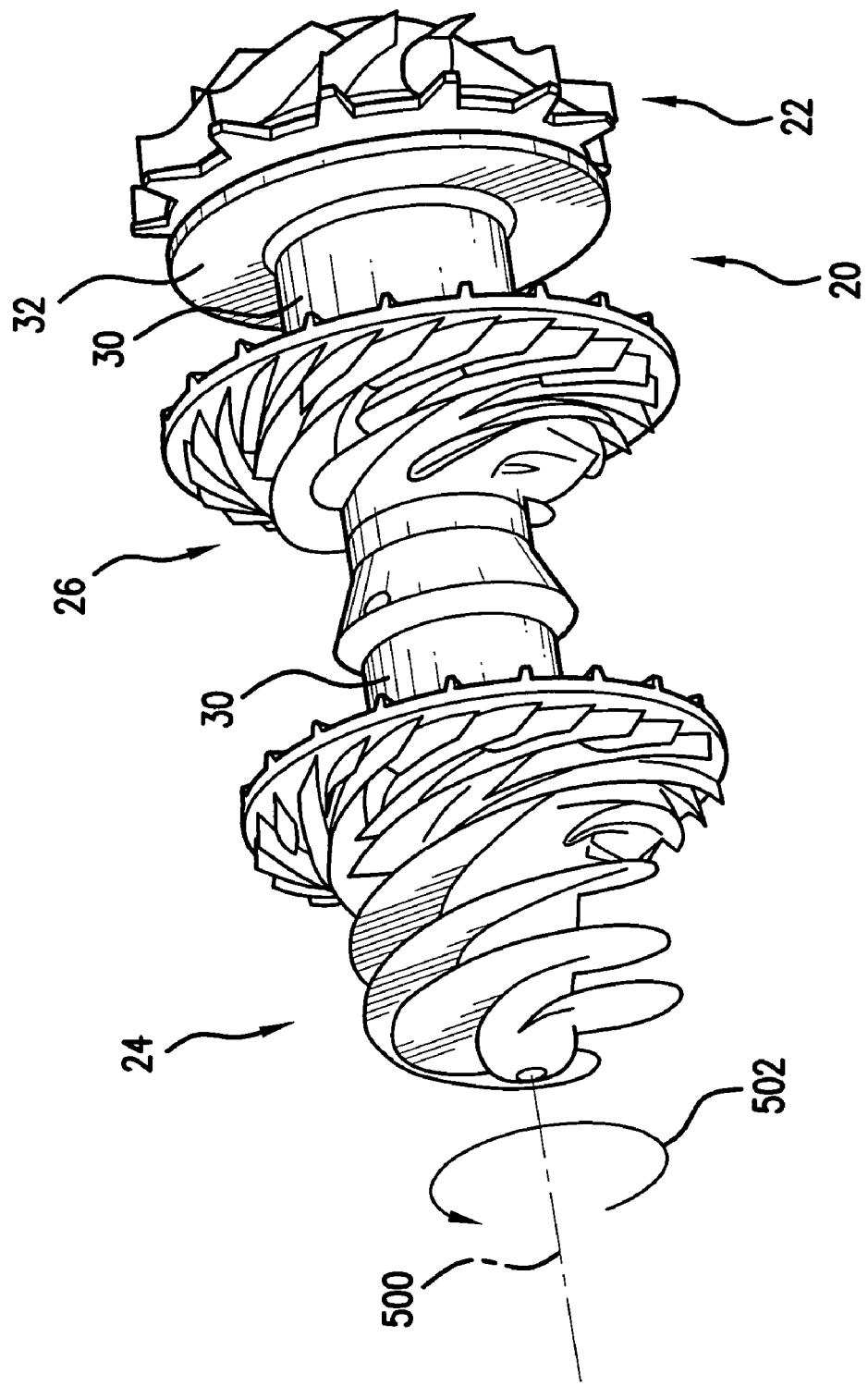
FIG. 1 is a view of a cryogenic turbopump rotor.

FIG. 1 shows a turbopump rotor 20 including a turbine 22 having vanes extending from a radial inlet to an axial outlet. The turbine and thus the rotor is driven about a longitudinal axis 500 in a direction 502 by the flow of a first fluid (e.g., rocket propellant or a component thereof). Exemplary rotational speeds may be in excess of 30,000 revolutions per minute (RPM), e.g., 80,000-100,000. The exemplary rotor has first and second pump stages 24 and 26 which may be in series, parallel, or separate circuits. The rotor 20 has one or more axial bearing surfaces 30 and thrust bearing surfaces 32.

Each exemplary pump stage extends from an axial inlet to a radial outlet. In the series example, the pump stages pump a single second fluid (e.g., rocket fuel or oxidizer) at cryogenic conditions. Exemplary cryogenic conditions are below −100° C., typically below −150° C. The first and second fluids may be the same. For example, a flow of hydrogen rocket fuel may be pumped through the stages 24 and 26 and then receive heat from the combustion chamber. The heated hydrogen flow then passes to the turbine before entering the combustion chamber. Alternate fuels include hydrazine and kerosene.

Figure 2:
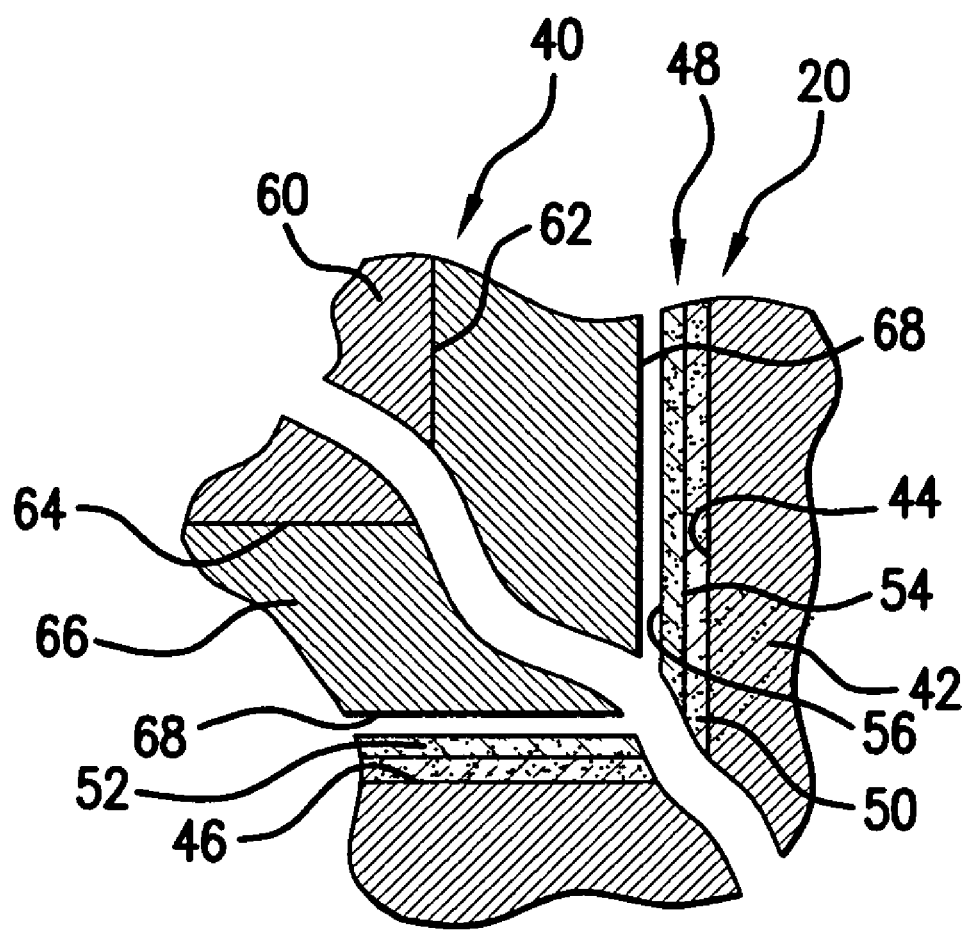
FIG. 2 is a partial longitudinal radial sectional view of journal and thrust surfaces of the rotor engaged with corresponding surfaces of a housing bearing portion.

FIG. 2 shows interaction between the rotor 20 and a bearing portion 40 of the pump housing. The rotor includes substrate material 42 (e.g., titanium or an alloy thereof) having a radially/circumferentially extending thrust surface 44 and a longitudinally/circumferentially extending journal surface 46. A coating system 48 is applied atop the surfaces 44 and 46 and has a DLN interior layer 50 and a DLC exterior layer 52. In the exemplary embodiment, the layers 50 and 52 meet along an interface 54 and the exterior layer 52 has an exterior surface 56. The coating layers 50 and 52 may be built-up by deposition such as physical vapor deposition (PVD) or plasma-assisted chemical vapor deposition (PACVD). Exemplary thickness for the coating system 48 is 0.5-5.0 μm, with each layer 50 and 52 representing at least 25% of that thickness and the thinner of the two layers representing at least 25% of the thickness of the other (thus admitting the possibility of additional layers such as a bond enhancement layer directly atop the substrate). Such deposition techniques may have an advantageously low deposition temperature (e.g., 200° C. or less). Such low temperatures may be advantageous in order to limit coarsening of the microstructure of the titanium alloy substrate and associated loss of advantageous physical properties of the substrate. Such low temperatures may also limit the total range of temperature excursion. Limiting the range of temperature excursion limits the significance of various causes of failure, including coefficient of thermal expansion (CTE) mismatch.

The bearing 40 includes a substrate 60 which may be formed of a superalloy. An exemplary superalloy is INCOLOY Alloy 909 (UNS N19909), available from Inco Alloys International, Inc. of Huntington W.V., a nickel-iron-cobalt alloy with a silicon addition and containing niobium and titanium for precipitation hardening. The nominal composition by weight percent is: Al 0.03; C 0.01; Co 13; Fe 42; Nb 4.7; Ni 38; Si 0.4; Ti 1.5. One exemplary group of superalloy compositions is Ni 38-58, Cr 17-23, Fe 13-40, Nb 3-6, Mo 3-10, Ti 0.4-2, and Al 0.2-4. The substrate 60 includes a radial/circumferential thrust surface 62 and a longitudinal/circumferential bushing surface 64. A solid lubricant coating 66 is deposited atop the surfaces 62 and 64 and has an exterior surface 68. The exemplary solid lubricant is silver (e.g., built up by electrolytic deposition as a single layer of uniform composition). An exemplary characteristic thickness of the coating 66 is 2.5-125 μm, more narrowly, 12.5-50 μm.

With the exemplary coating combination, the DLN layer 50 is selected for hardness, wear resistance, and compatibility with the material of the substrate 42. For example, exemplary coefficients of thermal expansion (CTE) for Ti alloys are 7.7-9.0×10$^{-6}$/K whereas an exemplary overall CTE of the coating 48 is 3.9×10$^{-6}$/K. Exemplary Ti alloys compositions include, in weight percent, Al3-6, Sn 0-3, and 0-4V or Zr, remainder Ti and impurities. Generally advantageous matching may occur when the CTE of the coating is at least 30% that of the substrate (e.g., 30-120% or 30-100%). The DLC layer 52 is selected for lubricity (e.g., in combination with the coating 66). The thickness of the coating 48 also influences compatibility. Thicker coatings have been observed to have poorer adherence characteristics (believed due to incorporated stress). For example, thicknesses of 2.0 μm or less have produced indentation adherence classifications of HF2 or stronger on German industry standard VDI 3198 (Verein Deutsche Ingeneur (VDI)— Richtlinie 3198: Beschichten von Werkzeugen in der Kaltmassivumformung CVD- und PVD-Verfahren. Düsseldorf, VDI, 1992). By contrast, increasing thickness to just 2.5 μm or greater may produce adherence classifications of HF5 or worse. Accordingly, exemplary advantageous thicknesses for the coating 48 are less than about 2.5 μm (e.g., 1.5-2.0 μm).

Figure 3:
FIG. 3 is a secondary electron micrograph image of a surface of a coating for the rotor bearing surfaces of FIG. 2.

Test data has been obtained for sample friction pucks and environmental test coupons. FIG. 3 shows the exposed surface 56 of the coating 48 (e.g., on a test coupon). High degrees of smoothness (e.g., an arithmetic average surface roughness, $R_A$, less than 8 μin) and density may be achieved.

Figure 4:
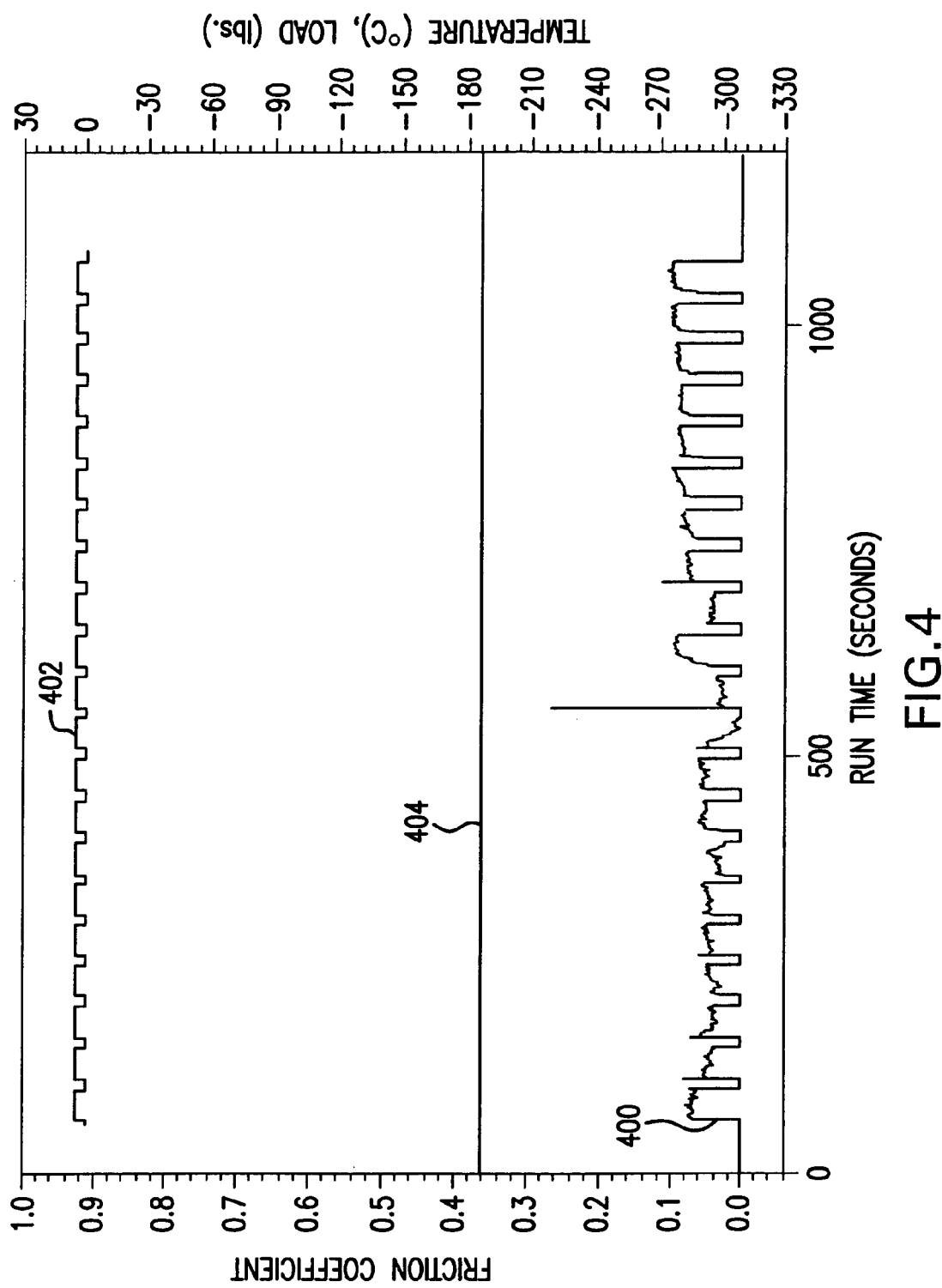
FIG. 4 is a plot of friction coefficient against time for the exemplary coating of FIG. 3 engaging a mating silver-coated substrate.

FIG. 4 shows plots of friction coefficient 400 and vertical load 402 against time in a laboratory test at an approximate temperature of −187 C. The test involved radial loads (rather than thrust) in the vicinity of 331 MPa. DLN/DLC coating thickness on the A-110 Ti alloy (nominal composition by weight percent: Al 5, Sn 2.5, Ti balance) puck was in the vicinity of 1.5-2.2 μm. Silver coating thickness on the Alloy 909 bushing was in the vicinity of 50 μm. Sliding speed was 700 m/s. The measured coefficient of friction was generally well under 0.2. Initially it was well under 0.1, but increased to almost exactly 0.1. Exemplary coefficient of friction is less than 0.15 at reference higher sliding speed/lower load and lower sliding speed/higher load conditions respectively of 5 MPa at 2000 m/s (e.g., for a 200,000 rpm pump) and 331 MPa at 200 m/s as well as at intermediate conditions.

Figure 5:
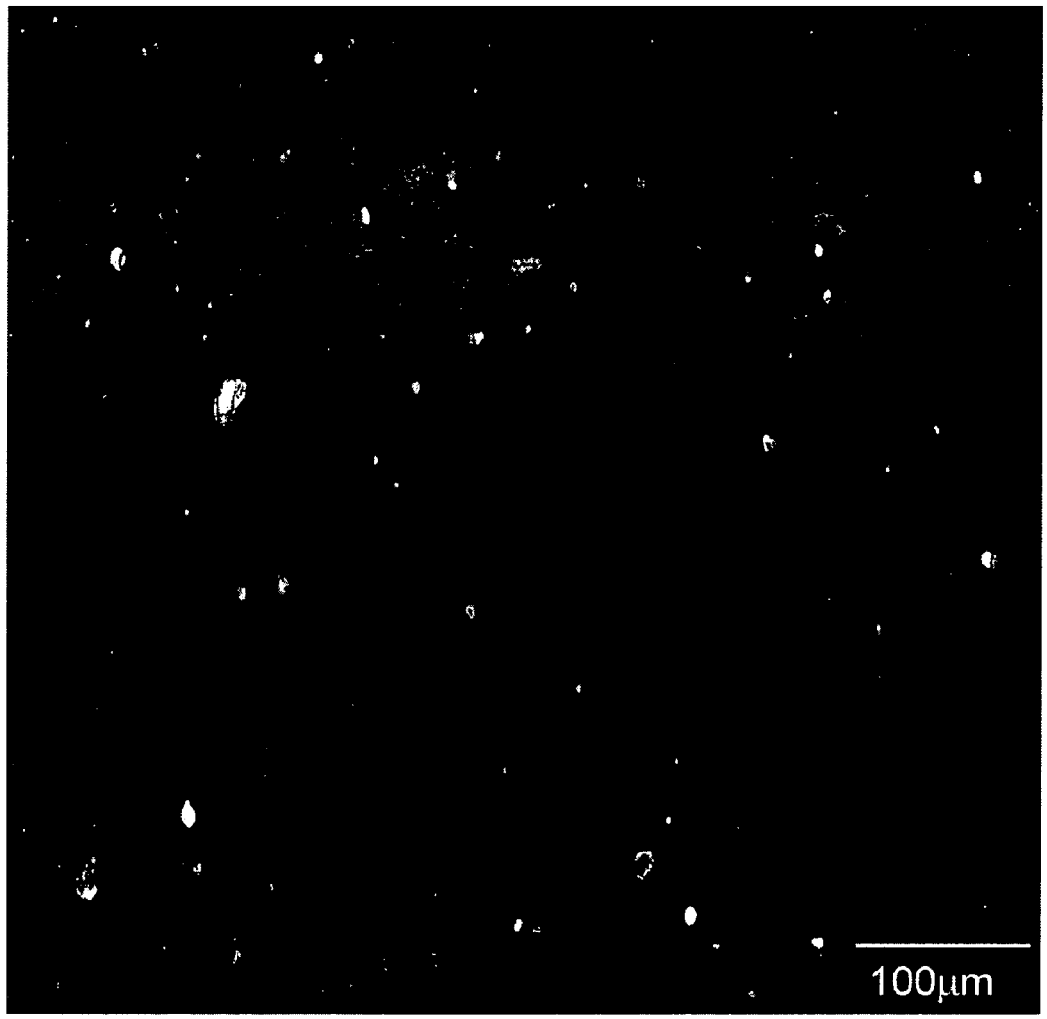
FIG. 5 is a backscatter electron image of the coating surface of FIG. 3 after the test of FIG. 4.

FIG. 5 shows the surface 56 after the tests of FIG. 4. There is relatively little damage to the surface and relatively little transfer of silver (light spots resulting from contrast based upon atomic number).

Among variations are the presence of a bond or adherence-promoting layer. Compositions for such layers could include Cr, Si, and/or amorphous SiC. Hybrid DLC-DLN layers are possible variants on layers essentially of one or the other as is a reversal of the order in which they occur (DLC innermost and DLN external to DLC). There may also be a number of repeating multiples of the alternating coating layers.

One or more embodiments of the present invention have been described. Nevertheless, it will be understood that various modifications may be made without departing from the spirit and scope of the invention. For example, when applied to an existing machine, details of the existing material as well as details of the operating condition (e.g., loads, speeds, temperatures, lifespans, and cycle properties) may influence the details of any particular implementation. Accordingly, other embodiments are within the scope of the following claims.

What is claimed is:

1. A bearing system comprising:
   a first component having a first substrate and a first coating, the first coating comprising a DLC layer and a DLN layer between the DLC layer and the substrate; and
   a second component having a second substrate and second coating in bearing engagement with the first component said bearing engagement consisting essentially of a sliding engagement, the second coating engaging the first coating via said sliding engagement.

2. The system of claim 1 wherein:
   the first coating consists essentially of the DLC layer and the DLN layer.

3. The system of claim 1 wherein:
   the first and second components are in the sliding engagement along an essentially radial intersection.

4. The system of claim 1 wherein:
   the bearing system is a non-foil journal bearing.

5. The system of claim 1 wherein:
   the second coating acts as a solid lubricant effective to provide a coefficient of friction of less than 0.2.

6. The system of claim 1 wherein:
   the second coating comprises silver in an amount effective to act as a solid lubricant.

7. The system of claim 1 wherein:
the second coating has a thickness of 2-50 μm.

8. The system of claim 1 wherein:
the second coating has a thickness of 12.5-50 μm.

9. The system of claim 1 wherein:
the first coating has a characteristic thickness of 0.5-5.0 μm.

10. The system of claim 1 wherein:
the first coating has a characteristic thickness of 1.5-2.2 μm;
the DLC layer and the DLN layer each provide at least 25% of said characteristic thickness; and
a thinner of the DLC layer and the DLN layer is at least 25% of a thickness of the other.

11. The system of claim 1 wherein:
the first coating has a characteristic thickness of 0.5-2.0 μm.

12. The system of claim 1 wherein:
the first coating has a characteristic adherence of HF2 or stronger.

13. The system of claim 1 wherein:
the first substrate is titanium-based.

14. The system of claim 1 wherein:
the second substrate is a superalloy, comprising in major mass part one or more of iron, nickel, and cobalt.

15. The system of claim 1 wherein:
the second substrate comprises in largest mass part one of iron, nickel, and cobalt.

16. The system of claim 1 wherein:
the first substrate is a rotor of a turbopump; and
the second substrate is a bearing of a housing of the turbopump.

17. The system of claim 16 wherein:
the turbopump is driven by a first flow of a first fluid; and
the turbopump pumps a second flow of a second fluid at a temperature below −150° C.

18. A turbopump comprising:
a housing; and
a rotor carried by the housing for rotation about a rotor axis, the housing and rotor cooperating to define a first flow path for a first fluid to drive said rotation and a second flow path for a second fluid to be pumped by the rotation;
wherein:
a first of the housing and rotor has a first substrate and a first coating, the first coating comprising a DLC layer and a DLN layer between the DLC layer and the substrate; and
a second of the housing and rotor is in sliding engagement with the first, the second comprising a substrate and silver-based solid lubricant coating in said sliding engagement.

19. The turbopump of claim 18 in combination with a flow, consisting in major part of one of liquid oxygen, liquid hydrogen, kerosene, and hydrazine, along the second flow path as said second fluid.

20. The turbopump of claim 18 wherein:
the housing comprises, in major weight part, one or more superalloys comprising in major part at least one of iron, nickel, and cobalt; and
the rotor comprises, in major weight part, one or more titanium alloys.

* * * * *